UNITED STATES PATENT OFFICE.

FRIEDRICH BERGIUS, OF HANOVER, GERMANY.

PROCESS FOR THE MANUFACTURE OF HYDROGEN FROM METALS AND WATER.

1,059,818.     Specification of Letters Patent.     Patented Apr. 22, 1913.

No Drawing.     Application filed August 26, 1912. Serial No. 717,202.

*To all whom it may concern:*

Be it known that I, FRIEDRICH BERGIUS, a citizen of the German Empire, residing at Hanover, Germany, have invented certain new and useful Improvements in Processes for the Manufacture of Hydrogen from Metals and Water, of which the following is a specification.

It is known that hydrogen can be obtained by the action of steam on iron or low oxids of iron, provided that the reaction is carried out at high temperatures of about 800° C. It is however difficult to obtain in that manner pure hydrogen on a large scale, as regenerated iron or iron oxids has to be used, and during regeneration impurities get into the iron which pass into the hydrogen. The high temperature of reaction in itself forms a considerable obstacle to the carrying out of the process. Finally, the process is rendered more difficult by the reaction taking place only on the surface of the iron or low iron oxid, which however is gradually rendered more and more impure by frequent regeneration, so that the iron material ultimately becomes useless.

It has been found that the reaction can be carried out not only at high temperature with steam, but also at a comparatively low temperature, for instance at 200° C. to 300° C. with liquid water. In that way, an absolutely pure hydrogen can be produced in a continuous current, for at the low temperature of reaction, the impurities of the iron which are formed during regeneration, are harmless. To that must be further added that during the reaction not only the surface of the iron is oxidized, but the whole iron material is converted with the liquid water into iron oxid and hydrogen. It must be finally mentioned that hydrogen is collected in the vessel used for reaction, in a highly compressed state, so that there is on the one hand a considerable gain of space in reaction, and the hydrogen can be charged direct, that is to say, without compressors, into carboys.

It is obvious that this process has a considerable advantage over the ones hitherto used.

The reaction between iron and water can be further accelerated by dissolving in water electrolytic conducting substances, such as neutral salts, acids, etc., for instance common salt, iron chlorid, small quantities of hydrochloric acid. If in addition to the metal decomposing the water, another more precious metal, for instance copper, nickel, platinum, is brought into contact with the liquid and with the metal to be dissolved, the reaction takes place still more quickly.

Examples: (1.) 50 kg. of iron shavings or about 65 kg. of protoxid of iron and 50 kg. of water, are heated in a closed iron vessel to 300° C. As soon as the pressure gage shows a pressure of 150 atmospheres, the valve on the lid of the vessel is opened, and the hydrogen is allowed to escape with such a high speed that the pressure does not sink considerably under the pressure indicated. The experiment supplies at first about 1 cubic meter of hydrogen per hour. After about half of the quantity of hydrogen theoretically possible has been obtained, the speed is reduced. (2) 50 kg. of iron waste or about 65 kg. of protoxid of iron, and 50 kg. of water in which 1 kg. of common salt is dissolved, are introduced into the closed iron vessel. A piece of copper plate is then introduced into the apparatus which is then closed. The apparatus is heated to 250° C., and the hydrogen generated is allowed to escape from the vessel by means of the valve, as soon as the pressure gage indicates about 120 atmospheres. About 7 cubic meters of pure hydrogen are obtained per hour. The iron or the protoxid of iron is converted almost to a theoretical quantity into $Fe_3O_4$ without the speed of the hydrogen generation materially decreasing. After the iron has been consumed, the vessel is opened, and the iron protoxid produced is regenerated with carbon or carbon oxid.

What I claim is:—

1. The process of generating hydrogen, comprising reacting on oxidizable inorganic substances by a heated aqueous liquid under high pressure.

2. The process of generating hydrogen, comprising decomposing a hydrogen-oxygen-containing solution while heated and under high pressure by an inorganic oxidizable substance, thereby oxidizing said substance by said solution, and liberating hydrogen.

3. The process of generating hydrogen, comprising heating a liquid containing water in a closed vessel to a temperature above its normal atmospheric boiling-point, reacting upon an oxidizable inorganic substance by said heated liquid, thereby decomposing water with oxidation of the said substance and liberation of hydrogen.

4. A process of generating hydrogen, comprising heating an aqueous solution containing electrolytes in a closed vessel to a temperature above its normal atmospheric boiling-point, reacting upon an oxidizable substance by said heated solution, thereby oxidizing said substance with liberation of hydrogen.

5. A process of generating hydrogen, comprising heating an aqueous solution containing electrolytes in a closed vessel to a temperature above its normal atmospheric boiling-point, reacting upon an oxidizable metal while said metal is in contact with a more electronegative metal by said heated solution, thereby oxidizing said oxidizable metal with liberation of hydrogen.

6. The process of generating hydrogen, comprising reacting on oxidizable inorganic substances by liquid water under high pressure and at a temperature above its normal boiling point, thereby decomposing the liquid water and liberating hydrogen.

7. The process of generating hydrogen under high pressure, comprising reacting on oxidizable inorganic substances by liquid water under high pressure and at a temperature considerably above its normal boiling point, thereby decomposing the liquid water, oxidizing the inorganic matter and liberating the hydrogen under high pressure.

In testimony whereof I affix my signature in presence of two witnesses.

FRIEDRICH BERGIUS.

Witnesses:
T. HENDY REED,
G. NOEL SEDDON.

---

Copies of this patent may be obtained for five cents each, by addressing the "Commissioner of Patents, Washington, D. C."